(12) United States Patent  
McGraw

(10) Patent No.: US 6,687,316 B1
(45) Date of Patent: Feb. 3, 2004

(54) HIGH RESOLUTION CORRELATOR TECHNIQUE FOR SPREAD SPECTRUM RANGING SYSTEM CODE AND CARRIER MULTIPATH MITIGATION

(75) Inventor: Gary A. McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/490,621

(22) Filed: Jan. 25, 2000

(51) Int. Cl.$^7$ ............... H04L 27/06; H04B 1/69
(52) U.S. Cl. .................. 375/343; 375/149
(58) Field of Search ................. 375/130, 206, 375/326, 343, 347, 371

(56) References Cited

U.S. PATENT DOCUMENTS

| | | | | |
|---|---|---|---|---|
| 5,414,729 A | * | 5/1995 | Fenton | 375/149 |
| 5,630,208 A | * | 5/1997 | Enge et al. | 455/65 |
| 5,808,582 A | * | 9/1998 | Woo | 342/357.12 |
| 5,901,183 A | * | 5/1999 | Garin et al. | 375/343 |
| 5,953,367 A | * | 9/1999 | Zhodzicshsky et al. | 375/147 |
| 6,272,189 B1 | * | 8/2001 | Garin et al. | 375/343 |

OTHER PUBLICATIONS

Gary A. McGraw, Bernard A. Schnaufer, "Peak Tracking/Measurement Compensation Multipath Mitigation Technique", Position Location and Navigation Symposium, IEEE 2000, 2000; p. 49–56.*

McGraw, G.A., "Analysis of Dynamic Response Requirements for GNSS Landing Systems", Position Location and Navigation Symposium, IEEE 2000, 2000; p. 471–478.*

Gary A. McGraw, Michael S. Braasch, "GNSS Multipath Mitigation Using Gated and High Resolution Correlator Concepts"Proceedings of ION GPS, Date Unknown, Kansas City, MO; pp 333–336.

Victor A. Veitsel, Alexey V. Zhdanov, Mark I. Zodzishsky, "The Mitigation of Multipath Errors by Strobe Correlators in GPS/GONASS Receivers" Moscow, Russia, Publication and Date Unknown; pp 38–45.

Ronald R. Hatch, Richard G. Keegan, Thomas A. Stansell, "Leica's Code and Phase Multipath Mitigation Techniques" Proceedings of ION NTM, Santa Monica, CA, Jan. 1997; pp 217–225.

Dr. Larence R. Weill, "GPS Multipath Mitigation by Means of Correlator Reference Waveform Design", Proceedings of ION NTM, Jan. 14–16, 1997, Fullerton, CA; pp 197–206.

Lionel Garin, Dr. Frank van Diggelen, Jean–Michel Rousseau, "Strobe & Edge Correlator Multipath Mitgation for Code", Proceedings of ION GPS; 1996, Kansas City, MO, pp 657–664.

Lionel Garin, Jean–Michel Rousseau, "Enhanced Strobe Correlator Multipath Rejection for Code & Carrier", Proceedings of ION–GPS; Sep. 16–19, 1997, Kansas City, MO, pp 559–568.

Sien–Chong Wu, Thomas V. Yunch, "Precise Kinematic Positioning with Simultaneous GPS Pseudorange and Carrier Phase Measurements", Publication, Location, and Date Unknown; pp 1–7.

* cited by examiner

Primary Examiner—Stephen Chin
Assistant Examiner—Lawrence Williams
(74) Attorney, Agent, or Firm—Nathan D. Jensen; Kyle Eppele

(57) ABSTRACT

Methods of measuring phase angle and decoding a pseudorandom noise (PRN) code by applying High Resolution Correlators, having three or more correlators signals, where at least two signals, or multiples of two, are equally distanced advanced or delayed signals from the PRN signal with the option of one signal substantially in sync with the PRN signal. A phase tracking error is computed when measuring phase angle or adjusting the relative timing difference by adjusting the phase of the locally generated PRN signals when the error signal has a non-zero magnitude, in a manner to drive said error signal to zero when decoding the PRN code.

12 Claims, 7 Drawing Sheets

HIGH RESOLUTION CORRELATOR TECHNIQUE FOR SPREAD SPECTRUM RANGING SYSTEM CODE AND CARRIER MULTIPATH MITIGATION

BACKGROUND OF THE INVENTION

A. Field of the Invention

This invention relates to a method of and apparatus for mitigation of multipath signals from Spread Spectrum Ranging System Code measurements and from Carrier Phase measurements. More specifically this invention relates to a method of and an apparatus for mitigation multipath signals utilizing multiple correlators, for both Ranging System Code and Carrier Phase.

B. Problems in the Art

Multipath is a dominant error source in high accuracy Global Navigation Satellite System (GNSS) applications. Multipath errors or "multipath fading" in C/A code pseudo-random noise (PRN) tracking with conventional early minus late correlators is often several meters in magnitude. A tracking error is caused by multipath distortion. Errors caused by multipath distortion can be reduced by narrowing the delay spacing between the early and late correlators to less than one chip in the Delay Lock Loop (DLL) detector. (A "chip" is the time during which the code remains a plus or minus one.) However, this technique does not eliminate multipath errors.

Throughout the previous decade, varieties of receiver architectures were introduced to mitigate multipath for C/A-code GPS or GLONASS. The so-called Narrow Correlator receiver, discussed above, was introduced in 1991 and its multipath-mitigation properties were documented subsequently. More recently the Multipath Estimating Delay-Lock Loop (MEDLL), Multipath Elimination Technology, Strobe and Edge Correlators, Early1-Early2 Tracker, Multipath Mitigator Types A and B, and Enhanced Strobe Correlator have been showcased. However, it is believed that the performance quoted for the Enhanced Strobe Correlator and the Multipath Mitigator Type B can only be achieved through gating of the incoming signal or a so-called superresolution technique.

Therefore, the primary feature of this present invention is to obtain significant multipath mitigation without the use of gating or utilizing a superresolution technique.

Other features of this present invention include:
  measuring a phase angle of a spread spectrum pseudo-random noise (PRN) encoded signal;
  mitigation of multipath errors while measuring a phase angle of a PRN encoded signal;
  measuring the relative time delay of a spread spectrum signal PRN code signal;
  mitigation of multipath errors while the measuring the delay of a spread spectrum PRN code signal;
  mitigation of multipath errors while measuring a phase angle of a PRN encoded signal through existing receivers; and
  mitigation of multipath errors while measuring time delay of a spread spectrum PRN code signal code through existing receivers; and
  complementary filtering for a combination of multipath mitigation and desirable noise characteristics.

SUMMARY OF THE INVENTION

A method of measuring phase angle of a pseudo-random noise (PRN) code spread spectrum signal by receiving a PRN signal, generating at least three correlator signals with quadrature phase components, taking linear combinations of the correlator signals to synthesize a high resolution correlator output for each quadrature phase component, and computing a phase tracking error signal from said quadrature phase high resolution correlator outputs.

Also a method of decoding a spread spectrum signal encoded on a PRN binary code, by receiving a PRN signal, generating at least four correlator signals corresponding to the received PRN code, mixing said PRN signals with received signal to obtain at least four measurements of the PRN code auto-correlation function, utilizing linear combinations of the correlation function to synthesize an error signal having a magnitude as a function of the relative timing difference between the incoming PRN code signal and the locally generated PRN reference signals that (a) is zero for a zero relative timing difference and for a majority of a range of the relative time difference between plus and minus on chip, and (b) increases as the relative timing difference changes from zero to another value within a central portion of said range, when the error signal has a non-zero magnitude, adjusting the relative timing difference by adjusting the phase of the locally generated PRN signals in a manner to drive said error signal to zero; and outputting the high resolution correlator (HRC) decoded signal.

DETAILED DESCRIPTION OF A PREFERRED EMBODIMENT

The paper by McGraw, G. A. and Braasch, M. S., "GNSS Multipath Mitigation Using Gated and High Resolution Correlator Concepts," in Proc. of the Nat. Tech. Meeting of Inst. of Navigation, San Diego, Calif., Jan. 25–27, 1999, pp. 333–342 is incorporated by reference.

The High Resolution Correlator (HRC) uses multiple correlator outputs to yield an approximation of the gated correlator.

Three Correlators

Figure 1:
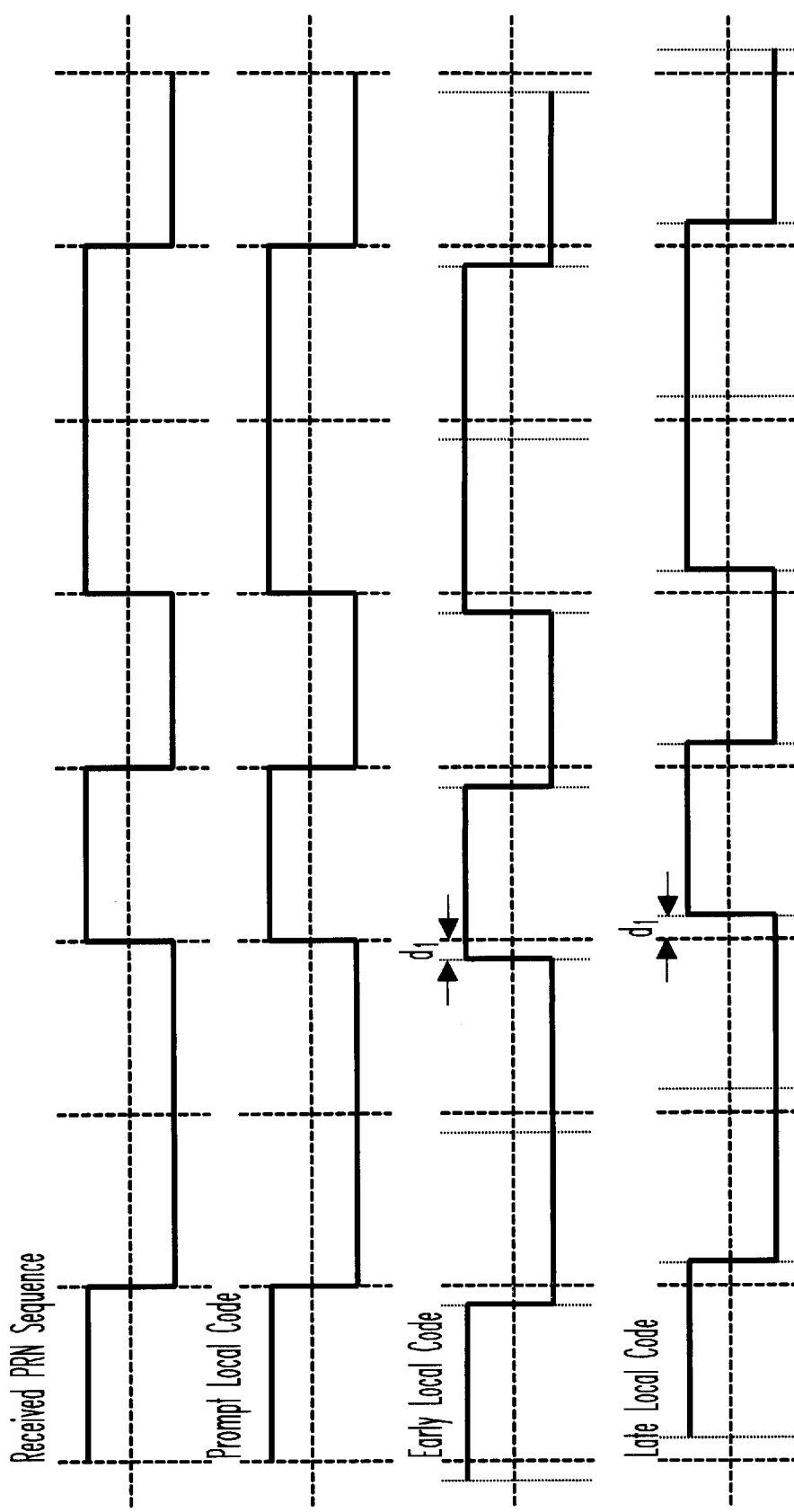
FIG. 1 is a graphical display of the timing relationships for three correlators per receiver channel.

As seen in FIG. 1, three correlators are designated as Early, Prompt, and Late. The Early and the Late are spaced $d_1$ chips from the Prompt, one on each "side" of Prompt as shown in FIG. 1.

Figure 2:
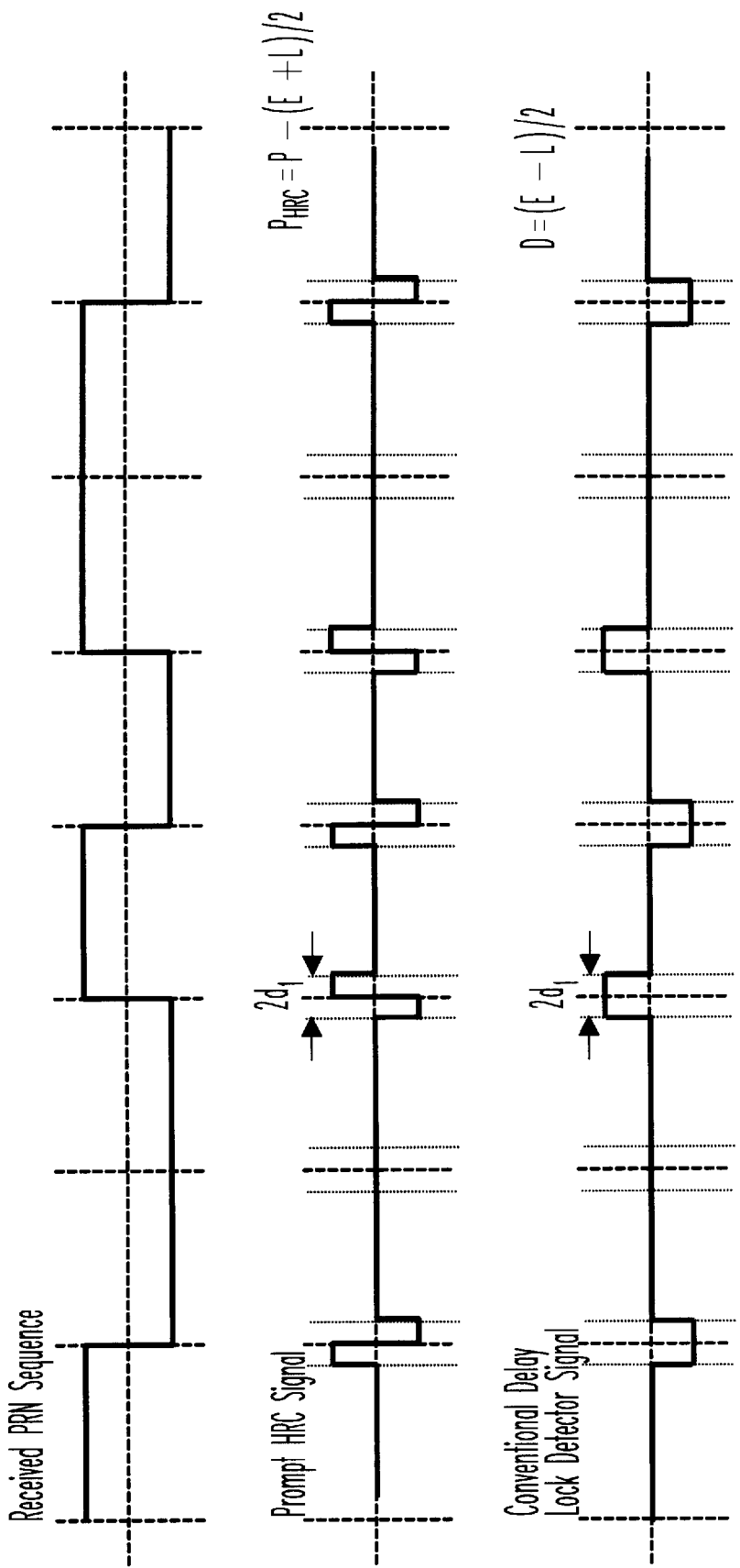
FIG. 2 is a graphical display of the synthesized correlator signals for three correlators per receiver channel.

As seen in FIG. 2, the following linear combination of correlator outputs yields a net prompt correlation function, which goes to zero quickly:

$$P_{HRC} = P - \frac{(E+L)}{2} \quad \text{Eq. 1}$$

$$D = \frac{(E-L)}{2}$$

This embodiment is effective for measuring the phase angle of a PRN binary code. The three correlator HRC has improved carrier multipath error characteristics over standard detectors because the Prompt HRC correlation function goes to zero much more rapidly compared to the conventional prompt correlation function.

Four Correlators

In another embodiment, four correlators are utilized. In this context the four correlators are denoted as Early2, Early1, Late1, and Late2. The HRC needs all four correlators for tracking an incoming spread spectrum PRN code signal.

Figure 3:
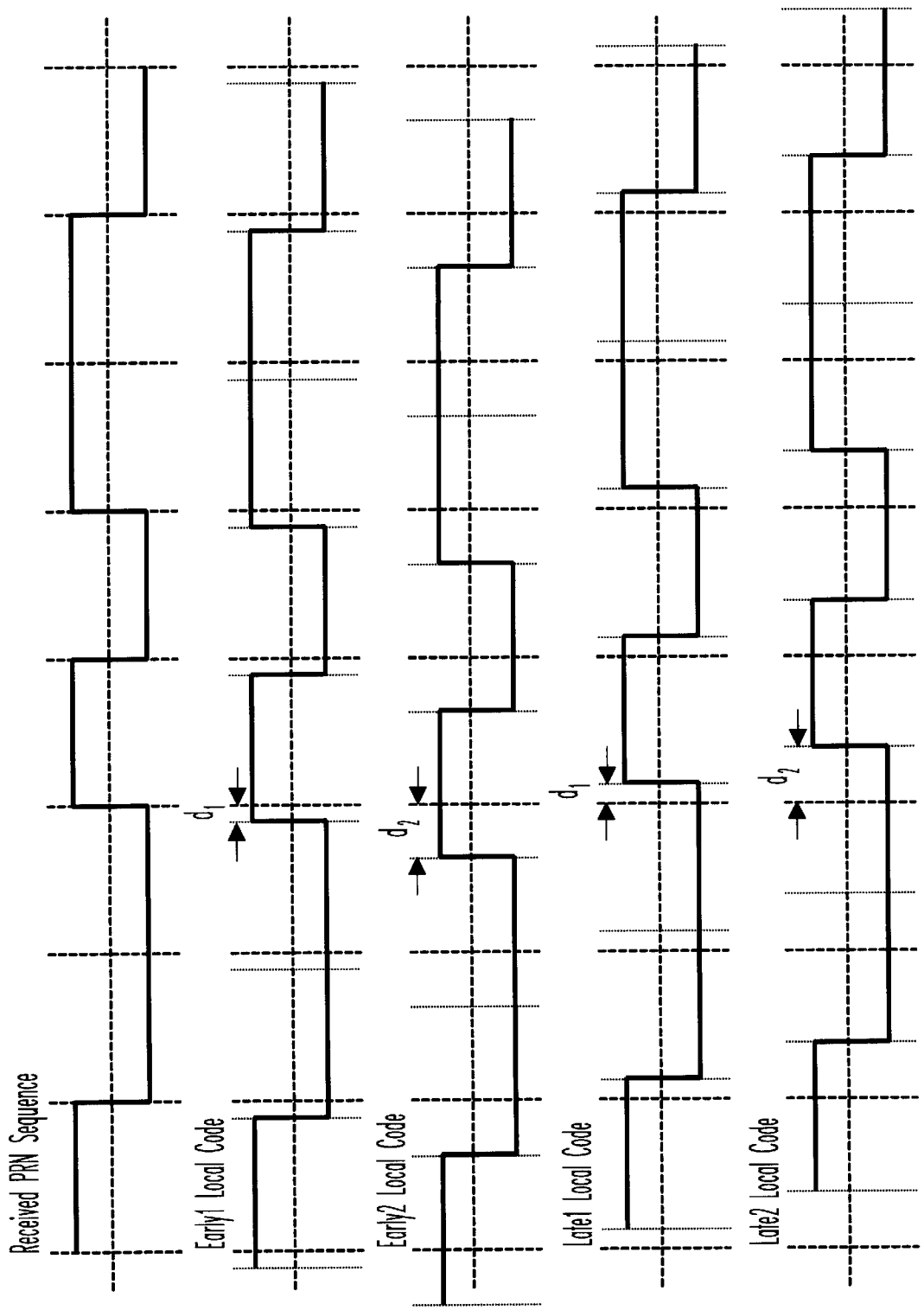
FIG. 3 is a graphical display of the timing relationships for four correlators per receiver channel.
Figure 4:
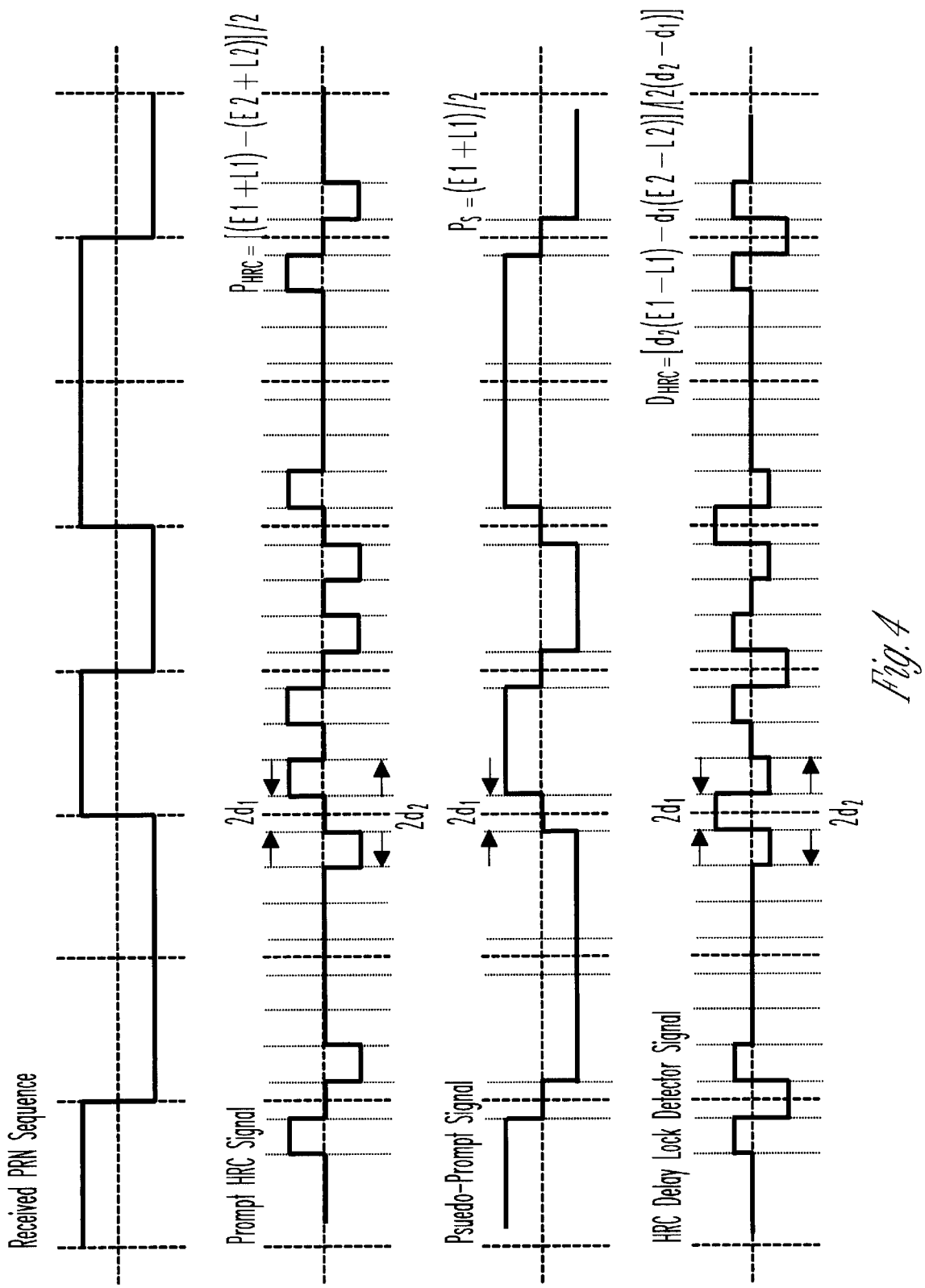
FIG. 4 is a graphical display of the synthesized correlator signals for four correlators per receiver channel.

As seen in FIG. 3, the nominal tracking point is between Early1 and Late1, as there is no explicit "Prompt" correlator. The Early1 and Late1 correlators are spaced $d_1$ chips on each "side" of where a Prompt correlator would be placed. It should be noted that in this embodiment the Prompt correlator is not present. The Early2 and Late2 correlators are spaced $d_2$ chips on each "side" of where a Prompt correlator would be placed. For the case of ideal PRN codes and infinite bandwidth the correlation functions are given by:

$$E_2(\tau) = R(\tau + d_2) \quad \text{Eq. 2}$$

$$E_1(\tau) = R(\tau + d_1)$$

$$L_1(\tau) = R(\tau - d_1)$$

$$L_2(\tau) = R(\tau - d_2)$$

$$R(\tau) = \begin{cases} 1 - |\tau|, & |\tau| < 1 \ C/A \ \text{Chip} \\ 0, & \text{otherwise} \end{cases}$$

It is preferred that the HRC forms a linear combination of correlator outputs that yields a net correlation function which goes to zero quickly. In this embodiment, the "Prompt HRC", "Pseudo-Prompt", and "EML HRC Delay-Lock Detector" correlators are synthesized as follows:

$$P_{HRC} = \frac{((E_1 + L_1) - (E_2 + L_2))}{2} \quad \text{Eq. 3}$$

$$P_0 = \frac{(E_1 + L_1)}{2}$$

$$D_{HRC} = \frac{[d_2(E_1 - L_1) - d_1(E_2 - L_2)]}{2*(d_2 - d_1)}$$

The DLL dot-product detector uses the DLL detector and the synthesized "pseudo-prompt" function:

$$\varepsilon_{DLL} = \frac{ID_{HRC} \times IP_0 + QD_{HRC} \times QP_0}{SP_0} \quad \text{Eq. 4}$$

$$SP_0 = IP_0^2 + QP_0^2$$

Where the prefixes I and Q denote respectively in-phase (with local reference signal) and quadrature phase (¼ cycle out of phase with local reference signal) components of the signal.

Carrier tracking can be carried out with the HRC prompt signal:

$$\theta_{HRC} = \arctan(QP_{HRC}, IP_{HRC}) \quad \text{Eq. 5}$$

Again, as with the three correlator HRC, the four correlator HRC has improved carrier multipath error characteristics over standard detectors because the HRC correlation function goes to zero much more rapidly, and additionally provides improved code multipath error characteristics over standard detectors.

Five Correlators

Figure 5:
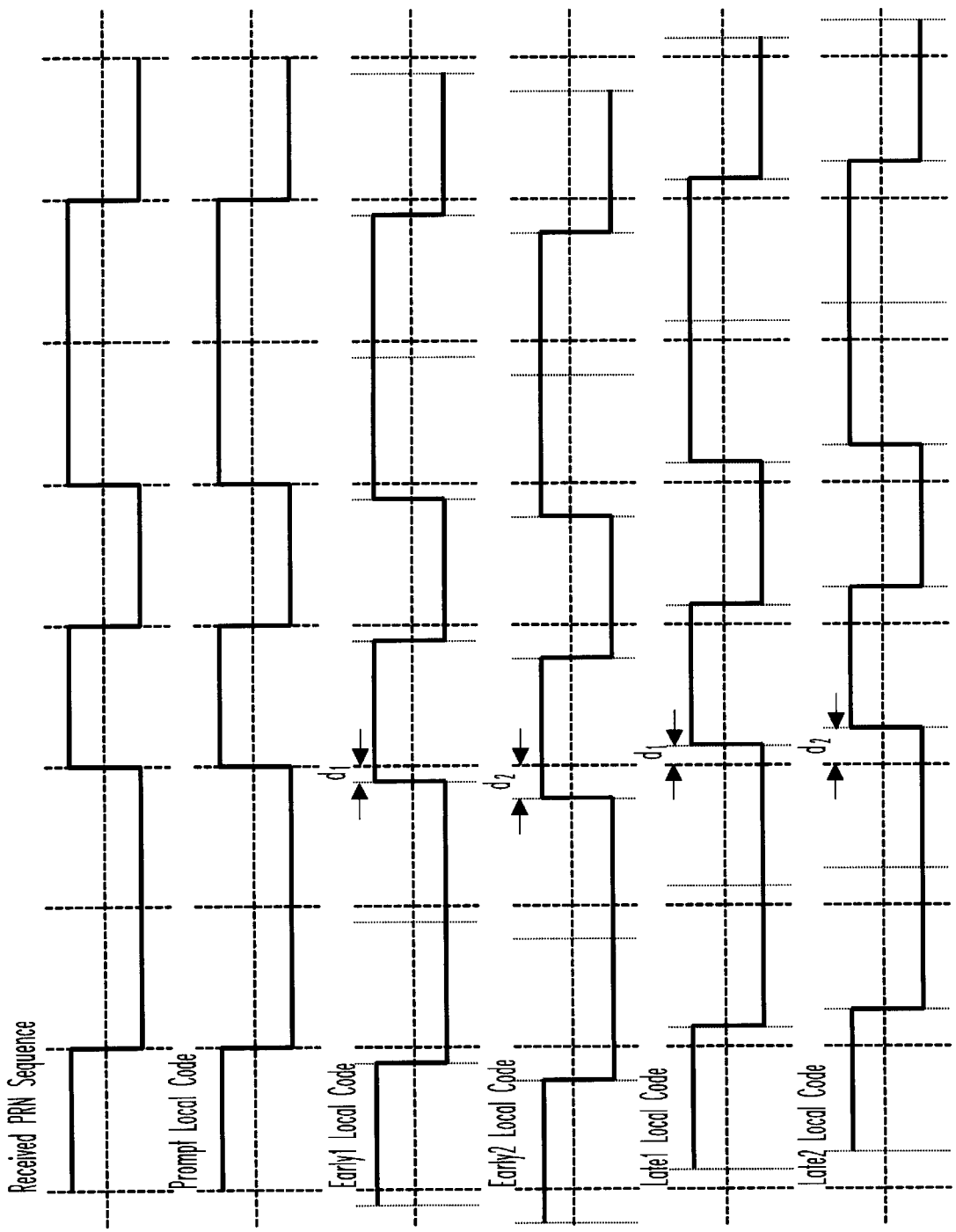
FIG. 5 is a graphical display of the timing relationships for five correlators per receiver channel.
Figure 6:
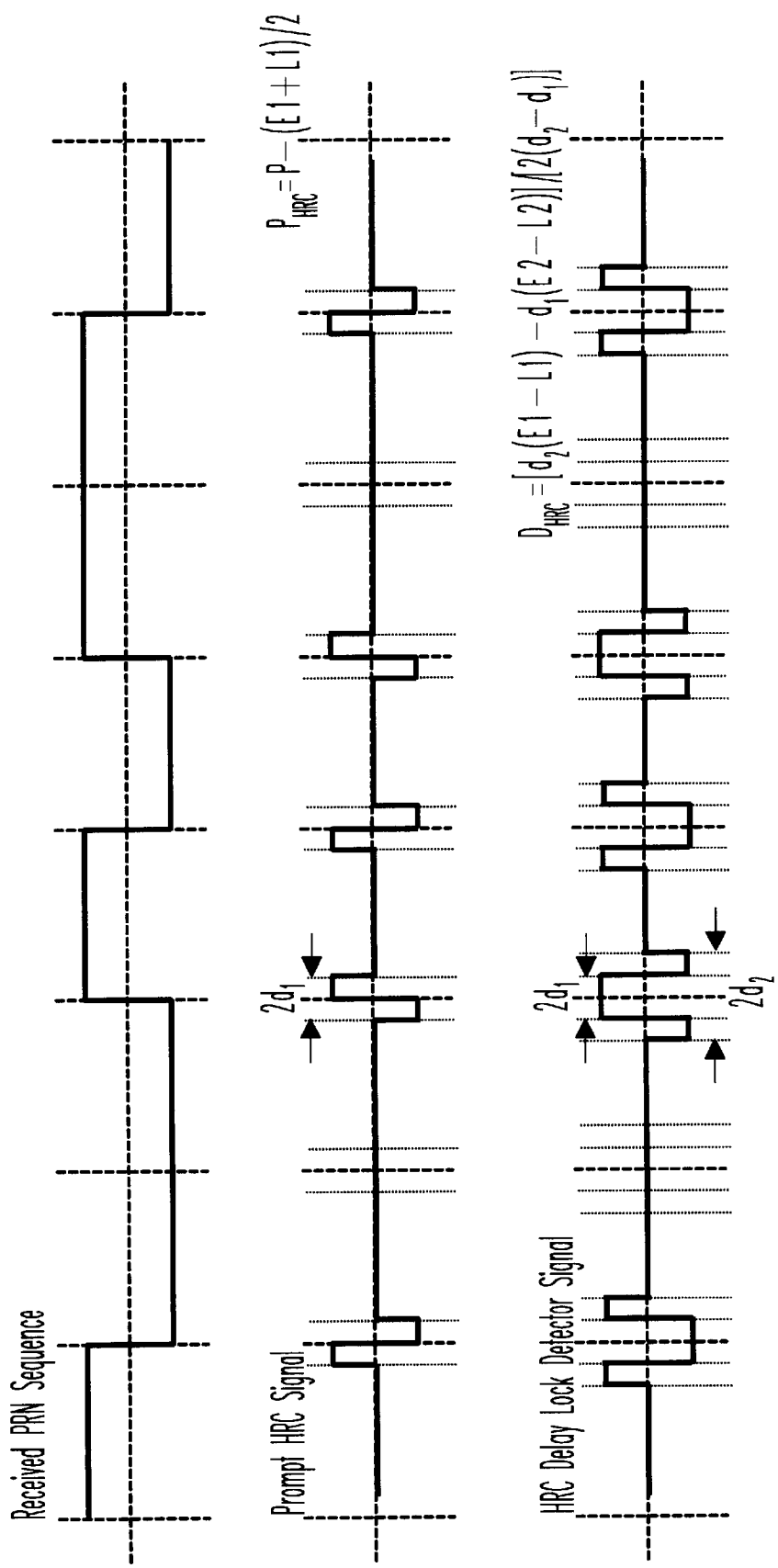
FIG. 6 is a graphical display of the synthesized correlator signals for five correlators per receiver channel.

From the above example, it is clear that additional correlators can be added. For example, as seen in FIG. 5, five correlators are similar to four correlators, with the addition of a prompt correlator. As seen in FIG. 6, the correlators are synthesized as:

$$P_{HRC} = P - \frac{(E_1 + L_1)}{2} \quad \text{Eq. 6}$$

$$D_{HRC} = \frac{[d_2(E_1 - L_1) - d_1(E_2 - L_2)]}{2(d_2 - d_1)}$$

One skilled in the art should appreciate that multitudes of embodiments to the HRC are available, simply by adding additional correlators.

Complementary Filtering

To compensate for the decrease degrading of the signal-to-noise ratio (SNR) of the synthesized prompt correlation signal when using the HRC, an embodiment of the present invention is to add a complementary filter. One skilled in the art will appreciate that the SNR of the HRC will be degraded by a factor roughly $d_1$ compared to a conventional detector.

Figure 7:
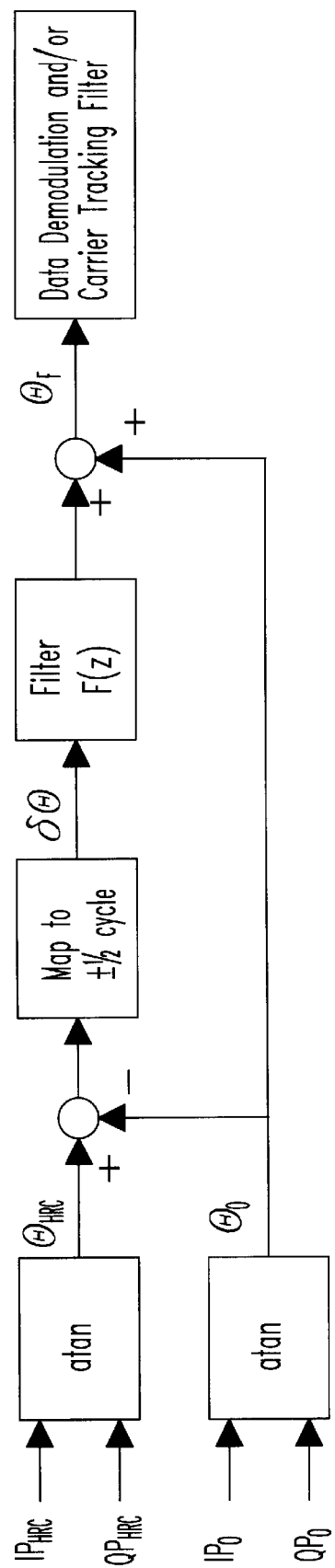
FIG. 7 is a schematic of a method of complementary filtering the HRC signals.

In FIG. 7, the processing for combining HRC and conventional phase measurements are illustrated. The HRC phase measurement, $\theta_{HRC}$, is noisy compared to the conventional phase measurement, $\theta_0$, but will typically have much smaller multipath errors. The difference between the HRC and conventional phase measurements, mapped to a single phase cycle, is filtered by the smoothing filter, F(z). The large noise present in $\theta_{HRC}$ is suppressed by the filter, but slowly varying multipath errors present in $\theta_0$ will remain. When the filter output is combined with $\theta_0$, the multipath will be cancelled. The design of the smoothing filter, F(z) can be tailored to trade-off between noise and multipath suppression.

One embodiment, as shown in FIG. 7, is to determine $\theta_{HRC}$ and $\theta_0$ where:

$$\theta_{HRC} = \arctan(QP_{HRC}, IP_{HRC})$$

$$\theta_0 = \arctan(QP_0, IP_0) \quad \text{Eq. 7}$$

where $P_0 = P$ when a prompt correlator is available, and $P_0 = P_S$ when the prompt correlator is synthesized. A noisy measurement of the multipath error on the conventional phase measurement is computed as:

$$\delta\theta = \theta_{HRC} - \theta_0 \quad \text{Eq. 8}$$

This phase difference $\delta\theta$ is mapped to ±½ cycle (±180°) and then filtered with a low-pass filter, F(z), to produce a smoothed measurement of the multipath. The filtered output is added with $\theta_0$ to produce a phase measurement with multipath characteristics like those of $\theta_{HRC}$ and SNR similar to $\theta_0$. This signal is provided to the Data Demodulation and/or Carrier Tracking Filter functions.

One skilled in the art will appreciate that this complementary filtering is preferred when the relative geometry of the multipath reflection and the antenna changes slowly, thereby producing multipath error whose nature is in the low frequency realm, as seen at stationary DGPS stations. One skilled in the art will appreciate that separation between multipath errors and thermal noise can be obtained simultaneously by way of this complementary filtering.

A general description of the present invention as well as an exemplary embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims amended hereto.

I claim:

1. A method of measuring carrier phase angle of a pseudo-random noise (PRN) code spread spectrum signal comprising:
   receiving a pseudo-random noise code spread spectrum signal;
   generating at least three correlator signals, wherein said signals have quadrature phase components;
   taking linear combinations of said correlator signals to synthesize a high resolution correlator output for each said quadrature phase component; and
   computing a carrier tracking error signal from said quadrature phase high resolution correlator outputs;
   tracking a spread spectrum signal carrier phase using said error signal to produce a high resolution correlator phase measurement.

2. The method of claim 1 wherein said correlator signals are derived from an advanced signal, a delayed signal and a prompt signal, wherein said prompt signal is substantially aligned with said PRN code signal, and wherein said advanced signal and said delayed signal are substantially equally distanced on opposing sides, less than one-half chip from said prompt signal.

3. The method of claim 2 wherein said correlator signals further have a second advanced signal and a second delayed signal, substantially equally distanced on opposing sides by less than one-half chip from said prompt signal.

4. The method of claim 1 wherein said correlator signals have an advanced signal, a delayed signal and a prompt signal, wherein said prompt signal is substantially aligned with said PRN code signal, and wherein said early1 signal and said late1 signal are substantially equally distanced on opposing sides, $d_1$ from said PRN signal.

5. The method of claim 4 wherein said correlator signals further have a second advanced signal and a second delayed signal, substantially equally distanced on opposing sides, $d_2$ from said PRN signal.

6. The method of claim 1 wherein said correlator signals are derived from a first advanced signal, a first delayed signal, and second advanced signal, and a second delayed signal, wherein said first advanced signal and said second delayed signal are substantially equally distanced on opposing sides, $d_1$ from said PRN signal, and wherein said second advanced signal and said second delayed signal are substantially equally distanced on opposing sides, $d_2$, from said PRN signal.

7. The method of claim 1 wherein said method further comprises filtering said phase tracking error signal with a complementary filter.

8. The method of claim 7 wherein said complementary filter combines said HRC phase measurement and a conventional phase measurement to suppress multipath on the conventional phase measurement.

9. The method of claim 8 wherein said combination of the HRC and conventional phase measurements is $\theta_F$, wherein $\theta_F$ is determined by:
   solving for $\delta\theta$ by subtracting $\theta_0$ from $\theta_{HRC}$;
   mapping $\delta\theta$ to $\pm\frac{1}{2}$ cycle,
   solving for $\theta_F$ by filtering $\delta\theta$ with a low-pass filter and adding $\theta_0$.

10. A method of determining the delay of an incoming spread spectrum signal having encoded thereon a pseudo-random noise (PRN) binary code, comprising:
    receiving a pseudo-random noise (PRN) binary code signal;
    generating at least four correlator signals corresponding to said PRN binary code of said received signal, wherein two of said signals being advanced in time of said received signal, and two of said signals being delayed in time of said received signal;
    mixing said PRN signals with said received signal to obtain at least four measurements of the PRN code auto-correlation function;
    utilizing linear combinations of said correlation function measurements to synthesize an error signal having a magnitude as a function of the relative timing difference between the incoming PRN code signal and the locally generated PRN reference signals that (a) is zero for a zero relative timing difference and for a majority of a range of the relative time difference between plus and minus one chip, and (b) increases as the relative timing difference changes from zero to another value within a central portion of said range;
    when the error signal has a non-zero magnitude within said central portion of said range, adjusting said relative timing difference by adjusting the phase of the locally generated PRN signals in a manner to drive said error signal to zero;
    outputting the high resolution correlator (HRC) code measurement;
    wherein said two signals advanced in time have a first advanced signal and a second advanced signal, and said two signals delayed in time have a first delayed signal and a second delayed signal; and
    wherein said first advanced signal and said first delayed signal are substantially equally distanced on opposing sides, $d_1$, from said PRN signal, and further have said second advanced signal and said second delayed signal, substantially equally distanced on opposing sides, $d_2$, from said PRN signal.

11. The method of claim 10 wherein a fifth prompt signal is generated corresponding to said received signal, wherein said prompt signal is substantially aligned in time with said received signal.

12. A method of determining the delay of an incoming spread spectrum signal having encoded thereon a pseudo-random noise (PRN) binary code, comprising:
    receiving a pseudo-random noise (PRN) binary code signal;
    generating at least four correlator signals corresponding to said PRN binary code of said received signal, wherein two of said signals being advanced in time of said received signal, and two of said signals being delayed in time of said received signal;
    mixing said PRN signals with said received signal to obtain at least four measurements of the PRN code auto-crrelation function;
    utilizing linear combinations of said correlation function measurements to synthesize an error signal having a magnitude as a function of the relative timing difference between the incoming PRN code signal and the locally generated PRN reference signals that (a) is zero for a zero relative timing difference and for a majority of a range of the relative time difference between plus and minus one chip, and (b) increases as the relative timing difference changes from zero to another value within a central portion of said range;
    when the error signal has a non-zero magnitude within said central portion of said range, adjusting said relative timing difference by adjusting the phase of the locally generated PRN signals in a manner to drive said error signal to zero;
    outputting the high resolution correlator (HRC) code measurement; and
    wherein a fifth prompt signal is generated corresponding to said received signal, wherein said prompt signal is substantially aligned in time with said received signal.

* * * * *